(12) United States Patent
Gaubil et al.

(10) Patent No.: US 8,765,620 B2
(45) Date of Patent: Jul. 1, 2014

(54) REFRACTORY PRODUCT HAVING HIGH ZIRCONIA CONTENT

(75) Inventors: Michel Gaubil, Les Angles (FR); Ludovic Massard, Monteux (FR); Isabelle Cabodi, Cavaillon (FR)

(73) Assignee: Saint-Gobain Centre de Recherches et d'Etudes Europeen, Coubevoie (FR)

( * ) Notice: Subject to any disclaimer, the term of this patent is extended or adjusted under 35 U.S.C. 154(b) by 19 days.

(21) Appl. No.: 13/515,632

(22) PCT Filed: Dec. 16, 2010

(86) PCT No.: PCT/IB2010/055887
§ 371 (c)(1),
(2), (4) Date: Jul. 17, 2012

(87) PCT Pub. No.: WO2011/073945
PCT Pub. Date: Jun. 23, 2011

(65) Prior Publication Data
US 2012/0295785 A1    Nov. 22, 2012

(30) Foreign Application Priority Data
Dec. 16, 2009  (FR) ...................................... 09 59037

(51) Int. Cl.
*C04B 35/484* (2006.01)

(52) U.S. Cl.
USPC ......................................... 501/105; 501/107

(58) Field of Classification Search
USPC ......................................... 501/104, 105, 107
See application file for complete search history.

(56) References Cited

U.S. PATENT DOCUMENTS

| | | | | |
|---|---|---|---|---|
| 5,466,643 A * | 11/1995 | Ishino et al. | ................. | 501/105 |
| 5,679,612 A | 10/1997 | Endo et al. | | |
| 7,129,192 B2 * | 10/2006 | Boussant-Roux et al. | .... | 501/105 |
| 7,598,195 B2 * | 10/2009 | Gupta et al. | ................. | 501/105 |
| 7,655,587 B2 * | 2/2010 | Boussant-Roux et al. | .... | 501/105 |
| 7,687,422 B2 * | 3/2010 | Boussant-Roux et al. | .... | 501/105 |
| 7,842,633 B2 * | 11/2010 | Tomura et al. | ................. | 501/105 |
| 8,124,554 B2 * | 2/2012 | Boussant-Roux et al. | .... | 501/103 |
| 2005/0159294 A1 | 7/2005 | Boussant-Roux et al. | | |
| 2008/0076659 A1 * | 3/2008 | Boussant-Roux et al. | .... | 501/105 |
| 2009/0038936 A1 | 2/2009 | Boussant-Roux et al. | | |
| 2010/0068492 A1 | 3/2010 | Boussant-Roux et al. | | |
| 2010/0257901 A1 | 10/2010 | Cabodi et al. | | |
| 2011/0212826 A1 * | 9/2011 | Cabodi et al. | ................. | 501/104 |
| 2012/0046156 A1 * | 2/2012 | Gaubil et al. | ................. | 501/104 |

FOREIGN PATENT DOCUMENTS

| | | |
|---|---|---|
| EP | 0 403 387 B1 | 12/1990 |
| FR | 1.208.577 | 2/1960 |
| FR | 75.893 | 7/1961 |
| FR | 82.310 | 12/1963 |
| FR | 2 701 022 A1 | 8/1994 |
| FR | 2 723 583 A1 | 2/1996 |
| FR | 2 836 682 A1 | 9/2003 |
| FR | 2 897 861 A1 | 8/2007 |
| FR | 2 913 013 A1 | 8/2008 |
| FR | 2 920 152 A1 | 2/2009 |
| RU | 2 039 026 C1 | 7/1995 |
| WO | WO 03/074445 A1 | 9/2003 |
| WO | WO 2005/068393 A1 | 7/2005 |

OTHER PUBLICATIONS

Aug. 29, 2011 Written Opinion issued in International Patent Application No. PCT/IB2010/055887 (with translation).

* cited by examiner

*Primary Examiner* — Karl Group
(74) *Attorney, Agent, or Firm* — Oliff PLC

(57) ABSTRACT

A fused and cast refractory product containing, in weight percentages on the basis of the oxides and for a total of 100%:
$ZrO_2$: remainder up to 100%
$Hf_2O$: <5%
$SiO_2$: 2% to 10%
$0.9\% < Y_2O_3 + CeO_2 + CaO + MgO \leq 4.0\%$
$B_2O_3$: ≤4.5%
$B_2O_3$: $\geq 0.09 \times (Y_2O_3 + \frac{1}{3}(CeO_2 + CaO + MgO)) \times SiO_2$
$Al_2O_3$: 0.3% to 2.0%
$Na_2O + K_2O$: ≤0.5%
$P_2O_5$: <0.05%
$Fe_2O_3 + TiO_2$: <0.55%
other species: <1.0%,
as long as the $Y_2O_3$ content is no lower than 0.5% and the $CeO_2 + CaO + MgO$ content is no lower than 2%.

13 Claims, No Drawings

REFRACTORY PRODUCT HAVING HIGH ZIRCONIA CONTENT

TECHNICAL FIELD

The invention relates to a novel fused and cast refractory product having a high zirconia content.

PRIOR ART

Among refractory products, a distinction is made between fused and cast products, which are well known for the construction of glass-melting furnaces, and sintered products.

In contrast to sintered products, fused and cast products generally comprise an intergranular vitreous phase binding the crystalline grains together. The problems posed by sintered products and by fused and cast products, and the technical solutions adopted for solving them, are therefore generally different. A composition developed for manufacturing a sintered product therefore cannot be used a priori as it is for manufacturing a fused and cast product, and vice versa.

The fused and cast products, often called electrocast products, are obtained by melting a mixture of suitable raw materials in an electric arc furnace or by any other technique that is suitable for these products. The molten material is then poured into a mold and then the product obtained undergoes a controlled cooling cycle so that it is brought to ambient temperature without cracking. This operation is called "annealing" by a person skilled in the art.

Among the fused and cast products, the electrocast products with high zirconia content are renowned for their quality of very high corrosion resistance without coloration of the glass produced and without generation of defects.

Conventionally, fused and cast products with high zirconia content also comprise sodium oxide ($Na_2O$) to prevent the formation of zircon from the zirconia and silica present in the product. The formation of zircon is in fact harmful since it is accompanied by a decrease in volume of the order of 20%, thus creating mechanical stresses that give rise to cracking.

FR 2 701 022 describes fused and cast products with high zirconia content that contain 7.0 to 11.2 wt. % of $SiO_2$, 0.05 to 1.0 wt. % of $P_2O_5$, 0.05 to 1.0 wt. % of boron oxide $B_2O_3$ and 0.01 to 0.12 wt. % of $Na_2O+K_2O$.

FR 2 723 583 describes fused and cast products with high zirconia content that contain 3 to 8 wt. % of $SiO_2$, 0.1 to 2.0 wt. % of $Al_2O_3$, 0.05 to 3.0 wt. % of boron oxide $B_2O_3$, 0.05 to 3 wt. % of $BaO+SrO+MgO$, and 0.05 to 0.6 wt. % of $Na_2O+K_2O$ and less than 0.3 wt. % of $Fe_2O_3+TiO_2$.

FR 2 836 682 describes fused and cast products with high zirconia content that contain 2 to 8 wt. % of $SiO_2$, 0.2 to 2.0 wt. % of $Al_2O_3$, 0.12 to 1.0 wt. % of $Na_2O$ and 0.5 to 2.6 wt. % of $Y_2O_3+CaO$.

The product ER-1195 produced and marketed by the Société Européenne des Produits Réfractaires ("European Refractory Products Company") and covered by patent EP-B-403 387 is now widely used in glass-melting furnaces. Its chemical composition comprises about 94% of zirconia, 4 to 5% of silica, about 1% of alumina, 0.3% of sodium oxide and less than 0.05 wt. % of $P_2O_5$. It is typical of the products with high zirconia content used for glassmaking furnaces.

These products have good performance but there is still a need for a fused product with high zirconia content offering good feasibility and long service life, notably when it is used in a glassmaking furnace tank.

The present invention aims to satisfy this need.

SUMMARY OF THE INVENTION

The invention proposes a fused and cast refractory product comprising, in percentages by weight based on the oxides and for a total of 100%:

$ZrO_2$: complement to 100%
$Hf_2O$: <5%
$SiO_2$: 2% to 10%
$Y_2O_5+CeO_2+CaO+MgO$: 0.8% to 4.0%
$B_2O_3$: ≤4.5%
$B_2O_3$: ≥0.09×($Y_2O_3$+⅓($CeO_2+CaO+MgO$))×$SiO_2$
$Al_2O_3$: 0.3% to 2.0%
$Na_2O+K_2O$: ≤0.5%
$P_2O_5$: <0.05%
$Fe_2O_3+TiO_2$: <0.55%
other species: <1.5%, provided that the $Y_2O_3$ content is greater than or equal to 0.5%, or greater than or equal to 0.7% or that the content of $CeO_2+CaO+MgO$ is greater than or equal to 2%.

A block of a tank of a glassmaking furnace is subjected in service to a temperature that decreases from its face in contact with the molten glass ("hot face") to its exposed face on the outside of the tank ("cold face"). Now, a product with high zirconia content conventionally has a temperature of maximum expansion between the temperatures of these two faces. Two adjacent blocks are therefore assembled so that they always remain in contact at least in the region where they are subjected to this temperature of maximum expansion. This ensures that at least in this critical region they will be able to provide impermeability of the tank. It is important to limit the corrosion in this critical region.

However, corrosion by molten glass generally increases with its temperature. The inventors therefore imagined that it could be advantageous to try to reduce the temperature of maximum expansion of the material of the blocks in order to displace said critical region towards the cold face of the blocks. In this way, this critical region can be in contact with molten glass that is more viscous and less corrosive than in the prior art.

As will be shown in more detail later in the description, as a result of their research, the inventors discovered that a product of the present invention has remarkable dilatometric behavior, and in particular a reduced temperature of maximum expansion. Moreover, this product retains high industrial feasibility.

In one embodiment, a product according to the invention comprises less than 0.5%, less than 0.3%, or even less than 0.1%, of each of the oxides $CeO_2$, CaO and MgO, or even does not comprise these oxides at all. Said oxides may only be present as impurities. The inventors have in fact observed that $Y_2O_3$ leads to the best results.

A product according to the invention can further comprise one or more of the following optional characteristics, including when it complies with the particular embodiments described below and these optional characteristics are not incompatible with said particular embodiments:

Preferably $B_2O_3$≥0.095×($Y_2O_3$+⅓($CeO_2+CaO+MgO$))×$SiO_2$;
Preferably $B_2O_3$≥0.1×($Y_2O_3$+⅓($CeO_2+CaO+MgO$))×$SiO_2$;
The content by weight of $ZrO_2+HfO_2$ is less than 97.0%, or even less than 96.5% and/or greater than 85.0%, or greater than 86.0%;

The content by weighs of silica $SiO_2$ is greater than 2.5%, or even greater than 3.0% and/or less than 9.0%, or even less than 8.0%, or even less than 7.0%, or even less than 6.0%;

The content by weight of MgO is less than 0.7%, less than 0.5%, less than 0.3% and/or greater than 0.1%;

The content by weight of $CeO_2$ is less than 0.7%, less than 0.5%, less than 0.3% and/or greater than 0.1%;

The content by weight of CaO is less than 0.7%, less than 0.5%, less than 0.3% and/or greater than 0.1%;

The content by weight of each of the oxides MgO, $CeO_2$ and CaO is less than 0.5%, less than 0.3%, or even less than 0.2%;

The content by weight of $Y_2O_3$+$CeO_2$+CaO+MgO is greater than 0.9%, and/or less than 3.5%, or even less than 3.0%;

The content by weight of $Y_2O_3$ is greater than 0.5%, or even greater than 0.6%, or even greater than 0.7%), or even greater than 0.8%, or even greater than 0.85%, or even greater than 0.9%, and/or less than 3.0%, or even less than 2.5%, or even less than 2.0%, or even less than 1.5%, or even less than 1.3%;

The content by weight of boron oxide $B_2O_3$ is greater than 0.2%, or even greater than 0.3%, or even greater than 0.4% and/or less than 3.5%, less than 3%, less than 2.5%, or even less than 2.0%, or even less than 1.5%, or even less than 1.0%;

The content by weight of alumina $Al_2O_3$ is less than 1.5%, or even less than 1.2%, or less than 1.0%;

The content by weight of alumina $Al_2O_3$ is greater than 0.4%, greater than 0.6%, or even greater than 0.7%;

The sum of the contents by weight of sodium oxide $Na_2O$ and potassium oxide $K_2O$ is less than 0.4%, or even less than 0.3%, less than 0.2%;

Sodium oxide $Na_2O$ is only present as impurities and its content by weight is less than 0.2%, or even less than 0.1%;

Potassium oxide $K_2O$ is only present as impurities and its content by weight is less than 0.2%, or even less than 0.1%;

The content by weight of iron oxides and/or titanium oxides, $Fe_2O_3$+$TiO_2$, is less than 0.4%, preferably less than 0.3%, preferably less than 0.2%;

The content by weight of BaO is less than 0.1%, or even less than 0.05%;

The total content by weight of "other species" is less than 1.0%, less than 0.6%, less than 0.5%, or even less than 0.3%;

The "other species" only consist of impurities;

The content by weight of any "other species" is less than 0.4%, or even less than 0.3%, or even less than 0.2%;

The oxides represent more than 98%, more than 99%, or even roughly 100% of the mass of the product.

According to a particular embodiment, the invention proposes a fused and cast refractory product comprising, in percentages by weight based on oxides:

$SiO_2$: <8%
$Y_2O_3$: <2.5%
$B_2O_3$: 0.3% to 2.5%
$Al_2O_3$: <1.5%.

According to a particular embodiment, the invention proposes a fused and cast refractory product comprising, in percentages by weight based on oxides:

$SiO_2$: 3% to 6%
$Y_2O_3$: <1.5%
$B_2O_3$: 0.4% to 1.0%
$Al_2O_3$: <1.2%.

The invention also relates to a process for manufacturing a refractory product according to the invention, comprising the following successive steps:

a) mixing raw materials to form an initial charge,
b) melting said initial charge until a molten material is obtained,
c) casting and solidification of said molten material, by cooling, so as to obtain a refractory product, this process being remarkable in that said raw materials are selected so that said refractory product complies with the invention.

Preferably, the oxides for which a minimum content is necessary, or precursors of these oxides, are added systematically and methodically. Preferably, the contents of these oxides are taken into account in the sources of the other oxides where they are conventionally regarded as impurities.

Preferably, cooling is controlled, preferably so as to be carried out at a rate of less than 20° C. per hour, preferably at a rate of about 10° C. per hour.

The invention also relates to a glass-melting furnace having a refractory product according to the invention, or a refractory product manufactured or that can be manufactured by a method according to the invention, in particular in regions intended to be in contact with molten glass. In a furnace according to the invention, the refractory product can advantageously form part of a tank for making glass by melting, notably by electric melting, where it may come in contact with molten glass at a temperature above 1200° C.

The invention also relates to a method for limiting corrosion in a region in which two blocks of a tank of a glassmaking furnace are only in contact when the tank contains molten glass. According to the invention, blocks of a product according to the invention are used.

DEFINITIONS

The percentages by weight of oxides refer to the total contents for each of the corresponding chemical elements, expressed in the form of the most stable oxide, according to the usual convention in the industry; therefore the suboxides are included and optionally nitrides, oxynitrides, carbides, oxycarbides, carbonitrides, or even the metallic species of the aforementioned elements.

"$Y_2O_3$+$CeO_2$+CaO+MgO" means conventionally $Y_2O_3$ and/or $CeO_2$ and/or CaO and/or MgO.

A "molten material" is a liquid mass which, to maintain its shape, must be contained in a container. It can contain some solid particles, but in an insufficient amount for them to be able to structure said mass.

"Impurities" means unavoidable constituents, introduced unintentionally and necessarily with the raw materials or resulting from reactions with these constituents. The impurities are not necessary constituents, but are merely tolerated. For example, the compounds forming part of the group of oxides, nitrides, oxynitrides, carbides, oxycarbides, carbonitrides and metallic species of iron, titanium, and chromium are impurities.

Unless stated otherwise, all the amounts of oxides in the products described and claimed are percentages by weight based on the oxides.

DETAILED DESCRIPTION OF THE INVENTION

In the fused and cast products according to the invention, the high content of zirconia $ZrO_2$ makes it possible to meet the requirements of high corrosion resistance without coloration of the glass produced or generating defects impairing the quality of said glass.

The hafnium oxide, $HfO_2$, present in the product according to the invention is the hafnium oxide naturally present in sources of zirconia. Its content in a product according to the invention is therefore less than 5%, generally less than 2%.

The presence of silica $SiO_2$ notably permits the formation of an intergranular vitreous phase that can efficiently accommodate the volume changes of zirconia during its reversible allotropic transformation, i.e. during transition from the monoclinic phase to the tetragonal phase. The content by weight of silica must be greater than 2%. Conversely, the addition of silica must not exceed 10% as said addition is made at the expense of the zirconia content and can therefore impair the corrosion resistance.

The presence of $B_2O_3$ notably makes it possible to improve the feasibility of the products. Conversely, the addition of boron oxide must not exceed 4.5% as this addition is made at the expense of the zirconia content and can therefore impair the corrosion resistance.

The presence of alumina $Al_2O_3$ is notably necessary for the formation of a stable vitreous phase and for good castability of the molten material in the mold. However, the addition of alumina must not exceed 2% as a higher content by weight can lead to instability of the vitreous phase (formation of mullite crystals), in particular owing to the presence of boron oxide.

The content by weight of $Na_2O+K_2O$ must not exceed 0.50% in order to limit the fly-off of raw materials, in particular of boron oxide. In a product according to the invention, the oxides $Na_2O$ and $K_2O$ are considered to have similar effects.

According to the invention, the content by weight of $Fe_2O_3$ $TiO_2$ is less than 0.55% and that of $P_2O_5$ is less than 0.05%. In fact, these oxides are harmful and their content must be limited to traces introduced as impurities with the raw materials.

The "other species" are species that are not listed above, namely species other than $ZrO_2$, $Hf_2O$, $SiO_2$, $Y_2O_3$, $CeO_2$, CaO, MgO, $B_2O_3$, $Al_2O_3$, $Na_2O$, $K_2O$, $P_2O_5$, $TiO_2$, and $Fe_2O_3$. In one embodiment, the "other species" are limited to species whose presence is not particularly desirable and which are generally present as impurities in the raw materials.

Conventionally, the sources of the oxides listed above do not comprise $Ta_2O_5$. The $Ta_2O_5$ content of a product according to the invention can be less than 0.9%, or less than 0.5%, or less than 0.2%.

In another embodiment, the "other species" can also comprise species whose presence is advantageous. Thus, in one embodiment, the product advantageously comprises at least 0.05% of barium oxide BaO. This oxide can be an impurity or can be added deliberately in the initial charge, if required. Preferably its content is less than 0.5%, as percentage by weight based on the oxides.

A product according to the invention can be manufactured conventionally following steps a) to c) described below:
a) mixing raw materials to form an initial charge,
b) melting of said initial charge until a molten material is obtained,
c) solidification of said molten material, by cooling, so as to obtain a refractory product according to the invention.

In step a), the raw materials are selected so as to guarantee the contents of oxides in the finished product.

In step b), melting is preferably carried out by the combined action of a fairly long electric arc, not producing reduction, and stirring, promoting reoxidation of the products.

To minimize the formation of nodules of a metallic appearance and avoid the formation of slits or splits in the final product, it is preferable to conduct the melting operation in oxidizing conditions.

The long-arc melting process described in French patent No. 1 208 577 and its additions No. 75893 and 82310 is preferably used.

This process consists of using an electric arc furnace in which the arc is struck between the charge and at least one electrode at a distance from this charge and controlling the length of the arc so that its reducing action is minimized, while maintaining an oxidizing atmosphere above the molten bath, and mixing said bath, either by the action of the arc itself, or by bubbling an oxidizing gas (air or oxygen, for example) in the bath or by adding substances to the bath that release oxygen, such as peroxides or nitrates.

In step c), cooling is preferably carried out at a rate of less than 20° C. per hour, preferably at a rate of about 10° C. per hour.

Any conventional method of manufacture of fused products based on zirconia intended for applications in glass-melting furnaces can be employed, provided that the composition of the initial charge enables products to be obtained that have a composition complying with that of a product according to the invention.

EXAMPLES

The following nonlimiting examples are given for the purpose of illustrating the invention.

In these examples, the following raw materials were used:
zirconia containing principally, on average by weight, 98.5% of $ZrO_2+HfO_2$, 0.2% of $SiO_2$ and 0.02% of $Na_2O$,
zircon sand at 33% silica,
yttrium and boron oxides of purity above 99%,
alumina of type AC44 sold by the company Pechiney and containing on average 99.4% of alumina $Al_2O_3$.

The products were prepared according to the conventional process of arc furnace melting, then cast to obtain blocks of dimensions 220 mm×450 mm×150 mm.

The chemical analysis of the products obtained is given in Table 1; this is an average chemical analysis, given in percentages by weight.

Feasibility

For each of these examples, the feasibility of the product is evaluated using a feasibility index Fl. A value of Fl equal to 1 corresponds to excellent feasibility (optimal manufacturing yield, no flaws on the parts obtained), and a value of Fl equal to 0 corresponds to unacceptable feasibility for industrial manufacture (through-cracks, parts broken up, etc.).

Samples for carrying out tests were taken from the various examples of blocks produced.

Measurement of the Temperature of Maximum Expansion Before Phase Change

The curve of expansion as a function of temperature is constructed and the temperature corresponding to maximum expansion, before the transformation (monoclinic to quadratic) of the zirconia, is noted, designated "T" in Table 1.

Example 1 corresponds to the product ER1195, which serves as reference.

TABLE 1

| Ex. | $ZrO_2$ | $SiO_2$ | $Y_2O_3$ | $Al_2O_3$ | $Na_2O$ | $B_2O_3$ | $0.09 \times Y_2O_3 \times SiO_2$ | FI | T |
|---|---|---|---|---|---|---|---|---|---|
| 1 | 95.1 | 3.45 | 0.00 | 1.15 | 0.30 | 0.00 | 0.00 | 1 | 1140° C. |
| 2 | 95.1 | 3.14 | 0.72 | 0.65 | 0.00 | 0.39 | 0.20 | 1 | 1083° C. |
| 3 | 93.5 | 4.20 | 0.83 | 0.96 | 0.00 | 0.51 | 0.31 | 1 | 1032° C. |
| 4 | 92.9 | 5.00 | 0.85 | 0.93 | 0.04 | 0.28 | 0.38 | 0 | 1034° C. |
| 5 | 90.9 | 6.26 | 0.86 | 1.16 | 0.00 | 0.84 | 0.48 | 1 | 1040° C. |
| 6 | 92.7 | 4.87 | 0.88 | 0.90 | 0.04 | 0.66 | 0.39 | 1 | 1029° C. |
| 7 | 95.1 | 2.59 | 0.97 | 1.03 | 0.05 | 0.28 | 0.23 | 1 | 1011° C. |
| 8 | 94.6 | 3.06 | 1.20 | 0.77 | 0.05 | 0.37 | 0.33 | 1 | 983° C. |
| 9 | 92.3 | 5.00 | 1.20 | 0.90 | 0.00 | 0.60 | 0.54 | 1 | 980° C. |
| 10 | 93.9 | 3.81 | 1.23 | 0.79 | 0.00 | 0.25 | 0.42 | 0 | 957° C. |

The results show the positive role of yttrium oxide. It is considered that a minimum content of 0.8% of yttrium oxide in the product is necessary for significantly lowering the temperature of maximum expansion before phase change, in particular so that this temperature is below 1050° C. Thus, it becomes possible, advantageously, to reduce the temperature of the molten glass in contact with the critical region, thus to increase its viscosity and therefore the corrosion that it produces. Advantageously, the risks of escapes of glass are therefore limited.

Comparison of examples 3 and 4 or 9 and 10 shows the importance of the presence of a minimum amount of boron oxide to obtain optimal feasibility in the presence of yttrium oxide. Comparison of examples 4 and 7 shows, however, that this minimum amount depends on the contents of yttrium oxide and of silica.

Moreover, other tests have also verified that the products according to the invention also display the other properties recognized for materials with high zirconia content, in particular resistance to corrosion by molten glass.

Of course, the present invention is not limited to the embodiments described and represented, supplied as nonlimiting examples for purposes of illustration.

The invention claimed is:

1. A fused and cast refractory product comprising, in percentages by weight based on oxides and for a total of 100%:

$ZrO_2$: complement to 100%,
$Hf_2O$: <5%,
$SiO_2$: 2% to 10%,
0.9%<$Y_2O_3$+$CeO_2$+$CaO$+$MgO$≤4.0%,
$B_2O_3$: ≤4.5%,
$B_2O_3$: ≥0.09×($Y_2O_3$+⅓($CeO_2$+$CaO$+$MgO$))×$SiO_2$,
$Al_2O_3$: 0.3% to 2.0%,
$Na_2O$+$K_2O$: ≤0.5%,
$P_2O_5$: <0.05%,
$Fe_2O_3$+$TiO_2$: <0.55%,
other species: <1.0%,
provided that a $Y_2O_3$ content is greater than or equal to 0.8%.

2. The product as claimed in claim 1, wherein $B_2O_3$≥0.095×($Y_2O_3$+⅓($CeO_2$+$CaO$+$MgO$))×$SiO_2$.

3. The product as claimed in claim 2, wherein $B_2O_3$≥0.1×($Y_2O_3$+⅓($CeO_2$+$CaO$+$MgO$))×$SiO_2$.

4. The product as claimed in claim 1, wherein a content of boron oxide is greater than 0.4%.

5. The product as claimed in claim 1, wherein a content of boron oxide is less than 2.5%.

6. The product as claimed in claim 1, wherein the content of yttrium oxide $Y_2O_3$ is less than 2.5%.

7. The product as claimed in claim 1, wherein a content of silica is less than 8.0%.

8. The product as claimed in claim 1, wherein a content of alumina is less than 1.5%.

9. The product as claimed in claim 1, wherein a content of alumina is greater than 0.7%.

10. The product as claimed in claim 1, wherein ($Na_2O$+$K_2O$)<0.3%.

11. The product as claimed in claim 1, wherein the total content by weight of the other species is less than 0.5%.

12. The product as claimed in claim 1, comprising less than 0.5% of each of the oxides $CeO_2$, $CaO$ and $MgO$.

13. A glass-melting furnace comprising, in a region intended to be in contact with molten glass, a refractory product as claimed in claim 1.

* * * * *